United States Patent
Lee et al.

(10) Patent No.: US 8,619,859 B2
(45) Date of Patent: Dec. 31, 2013

(54) MOTION ESTIMATION APPARATUS AND METHOD AND IMAGE ENCODING APPARATUS AND METHOD EMPLOYING THE SAME

(75) Inventors: Sang-jo Lee, Suwon-si (KR); Ho-jin Lee, Seoul (KR); Do-hyung Kim, Hwaseong-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1352 days.

(21) Appl. No.: 11/779,415

(22) Filed: Jul. 18, 2007

(65) Prior Publication Data
US 2008/0019448 A1 Jan. 24, 2008

(30) Foreign Application Priority Data
Jul. 24, 2006 (KR) .................. 10-2006-0069411

(51) Int. Cl.
*H04N 7/12* (2006.01)
(52) U.S. Cl.
USPC ............. 375/240.14; 375/240; 375/240.01; 375/240.12; 375/240.16; 382/232; 382/236; 382/238
(58) Field of Classification Search
USPC .............. 375/240, 240.01, 240.12, 240.14, 375/240.16; 382/232, 236, 238
See application file for complete search history.

(56) References Cited

U.S. PATENT DOCUMENTS

| | | | | |
|---|---|---|---|---|
| 6,674,798 B2* | 1/2004 | Ishihara et al. | .......... | 375/240.16 |
| 6,987,866 B2* | 1/2006 | Hu | ................ | 382/107 |
| 8,300,696 B2* | 10/2012 | Liang et al. | ............. | 375/240.16 |
| 2005/0074064 A1* | 4/2005 | Lee et al. | ................ | 375/240.16 |
| 2005/0114093 A1* | 5/2005 | Cha et al. | ....................... | 702/189 |
| 2005/0135484 A1* | 6/2005 | Lee et al. | ................ | 375/240.16 |
| 2006/0002474 A1* | 1/2006 | Au et al. | ................ | 375/240.16 |
| 2006/0008008 A1* | 1/2006 | Song | ........................ | 375/240.16 |
| 2006/0109905 A1* | 5/2006 | Seok et al. | ............... | 375/240.16 |
| 2006/0203911 A1* | 9/2006 | Zhou et al. | ............... | 375/240.16 |

(Continued)

FOREIGN PATENT DOCUMENTS

| KR | 1998-026639 | 7/1998 |
|---|---|---|
| KR | 100261077 | 4/2000 |
| KR | 1020010002990 | 1/2001 |

OTHER PUBLICATIONS

Fast Inter Mode Decision with Adaptive Thresholds for H.264 Encoding; 0-7803-8526-8/04/$20.00 © 2004 IEEE; D. Wu, S. Wu, K.O. Lim, F. Pan, S.G. Li, C.C. Ko; pp. 406-409.

(Continued)

*Primary Examiner* — Nathan Flynn
*Assistant Examiner* — Sarah Su
(74) *Attorney, Agent, or Firm* — Stanzione & Kim, LLP

(57) ABSTRACT

Provided are a motion estimation apparatus and method and an image encoding apparatus and method employing the same. The motion estimation apparatus includes an optimal motion estimation unit performing motion estimation in an initial block mode while skipping remaining block modes excluding the initial block mode from a plurality of block modes of the current block, or performing motion estimation in candidate block modes determined from the plurality of block modes.

23 Claims, 9 Drawing Sheets

(56) References Cited

U.S. PATENT DOCUMENTS

| | | | |
|---|---|---|---|
| 2007/0076795 A1* | 4/2007 | Lee | 375/240.16 |
| 2007/0092010 A1* | 4/2007 | Huang et al. | 375/240.17 |
| 2007/0153897 A1* | 7/2007 | Yan | 375/240.16 |
| 2007/0195885 A1* | 8/2007 | Liang | 375/240.16 |
| 2007/0297512 A1* | 12/2007 | Lee et al. | 375/240.16 |
| 2008/0117976 A1* | 5/2008 | Lu et al. | 375/240.16 |
| 2008/0152000 A1* | 6/2008 | Kaushik | 375/240.03 |
| 2010/0290530 A1* | 11/2010 | Huang et al. | 375/240.16 |

OTHER PUBLICATIONS

Text Description of Joint Model Reference Encoding Methods and Decoding Concealment Methods; Study of ISO/IEC 14496-10 and ISO/IEC 14496-5/AMD6; Study of ITU-T Rec. H.264 and ITU-T Rec. H.2.64.2; Joint Video Team (JVT) of ISO/IEC MPEG and ITU-T VCEG, Hong Kong, Jan. 2005; Document JVT-N046, File: JVT-N046.doc, Generated: Feb. 22, 2013; Keng-Pang Lim, Gary Sullivan and Thomas Wiegand.

* cited by examiner

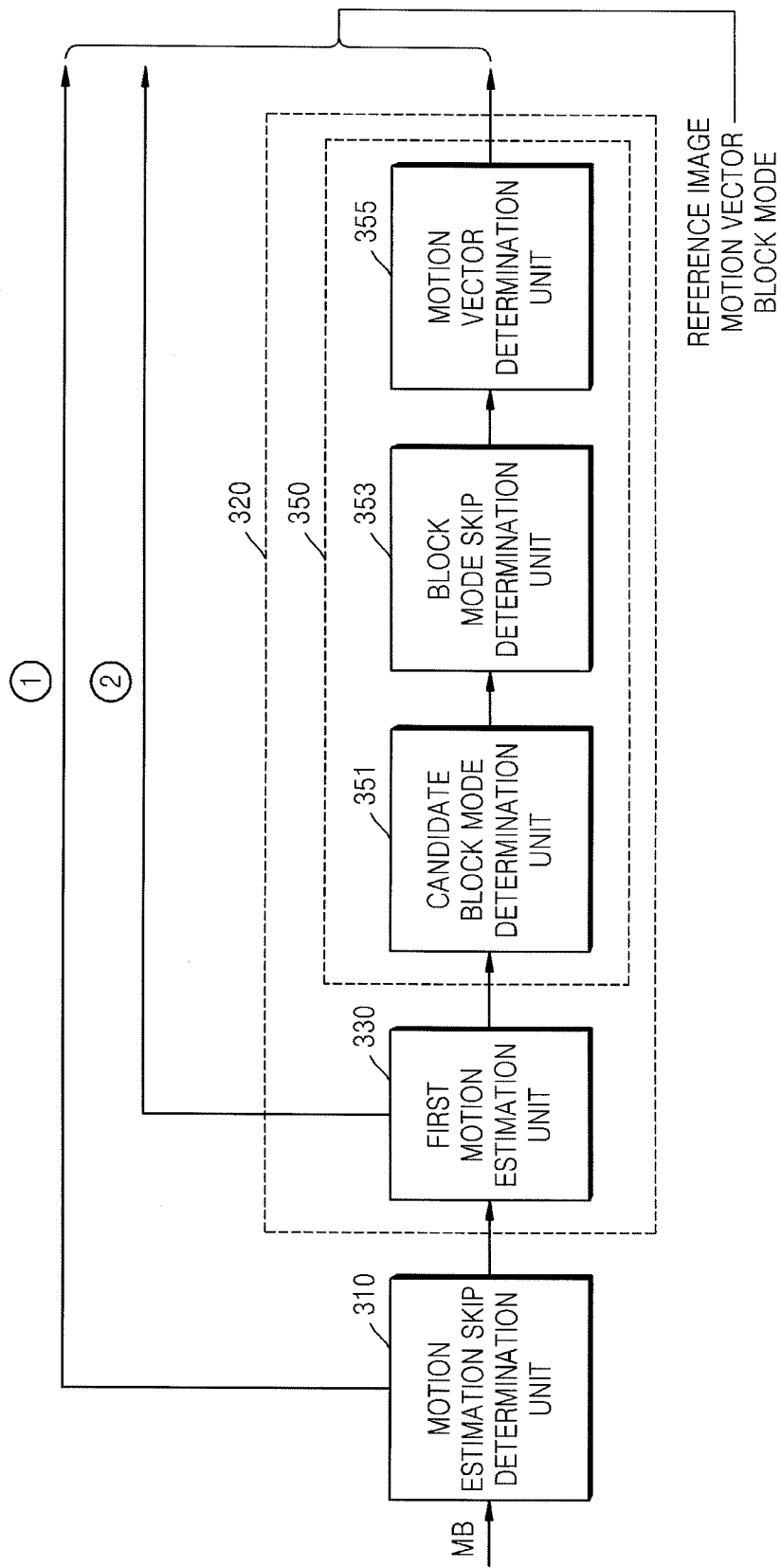

MOTION ESTIMATION APPARATUS AND METHOD AND IMAGE ENCODING APPARATUS AND METHOD EMPLOYING THE SAME

CROSS-REFERENCE TO RELATED APPLICATIONS

This application claims the priority of Korean Patent Application No. 10-2006-0069411, filed on Jul. 24, 2006, in the Korean Intellectual Property Office, the disclosure of which is incorporated herein in its entirety by reference.

BACKGROUND OF THE INVENTION

1. Field of the Invention

The present invention relates to image encoding, and more particularly, to a motion estimation apparatus and method which perform motion estimation using a plurality of block modes and an image encoding apparatus and method employing the motion estimation apparatus and method.

2. Description of the Related Art

Generally, image encoding apparatuses, such as H.264, use various types of block modes when performing spatial prediction, i.e., intra prediction, or temporal prediction, i.e., inter prediction. During inter prediction in particular, in order to determine an optimal block mode for an encoding block among various types of block modes during inter prediction, motion estimation and encoding are performed on the encoding block in all block modes. Then, the number of bits generated as a result of encoding is checked, and a block mode corresponding to the smallest number of bits is determined to be a block mode of each encoding block. Accordingly, real motion estimation is performed on each encoding block in the determined block mode.

However, when motion estimation and encoding are performed in advance in all possible block modes as described above, calculation complexity increases while the accuracy of motion estimation and encoding is high, thereby slowing down the overall encoding speed. Therefore, the above method of determining an optimal block mode is not suitable for an application that requires real-time processing.

SUMMARY OF THE INVENTION

The present invention provides a motion estimation apparatus and method which minimizes the number of block modes to be used in performing motion estimation in a plurality of block modes.

The present invention also provides an image encoding apparatus and method employing the motion estimation apparatus and method.

According to an aspect of the present invention, there is provided a motion estimation apparatus including an optimal motion estimation unit performing motion estimation in an initial block mode while skipping remaining block modes excluding the initial block mode from a plurality of block modes of the current block, or performing motion estimation in candidate block modes determined from the plurality of block modes.

The motion estimation apparatus further comprises a motion estimation skip determination unit performing preliminary motion estimation on the current block using an initial motion vector in the initial block mode and determining whether to skip motion estimation of the current block according to the result of preliminary motion estimation.

According to another aspect of the present invention, there is provided a motion estimation apparatus including a first motion estimation unit performing preliminary motion estimation on a current block using an initial motion vector in an initial block mode and determining the initial block mode to be a block mode of the current block according to the result of preliminary motion estimation; a candidate block mode determination unit determining a plurality of candidate block modes of the current block using a plurality of motion vectors which are obtained after preliminary motion estimation is performed on a plurality of sub blocks that form the current block; a block mode skip determination unit determining whether to skip remaining block modes excluding the initial block mode from the candidate block modes of the current block; and a motion vector determination unit determining a motion vector of the current block using the initial block mode or the candidate block modes comprising the initial block mode.

According to another aspect of the present invention, there is provided a motion estimation method including: performing motion estimation in an initial block mode while skipping remaining block modes excluding the initial block mode from a plurality of block modes of the current block, or performing motion estimation in candidate block modes determined from the plurality of block modes.

According to another aspect of the present invention, there is provided a motion estimation method including: performing preliminary motion estimation on a current block using an initial motion vector in an initial block mode and determining the initial block mode to be a block mode of the current block according to the result of preliminary motion estimation; determining a plurality of candidate block modes of the current block using a plurality of motion vectors which are obtained after preliminary motion estimation is performed on a plurality of sub blocks that form the current block; determining whether to skip remaining block modes excluding the initial block mode from the candidate block modes of the current block; and determining a motion vector of the current block using the initial block mode or the candidate block modes comprising the initial block mode.

According to another aspect of the present invention, there is provided an image encoding apparatus including a motion estimation unit performing motion estimation in an initial block mode while skipping remaining block modes excluding the initial block mode from a plurality of block modes of the current block, or performing motion estimation in candidate block modes determined from the plurality of block modes; and an encoding unit encoding the residual signal generated by using the output of the motion estimation unit.

According to another aspect of the present invention, there is provided an image encoding method including performing motion estimation in an initial block mode while skipping remaining block modes excluding the initial block mode from a plurality of block modes of the current block, or performing motion estimation in candidate block modes determined from the plurality of block modes; and encoding the residual signal generated by using the result of the performing of the motion estimation.

The motion estimation method and the image encoding method can also be implemented as computer-readable programs on a computer-readable recording medium.

BRIEF DESCRIPTION OF THE DRAWINGS

The above and other features and advantages of the present invention will become more apparent by describing in detail exemplary embodiments thereof with reference to the attached drawings in which:

FIG. 3 is a block diagram of a motion estimation apparatus according to an embodiment of the present invention;

DETAILED DESCRIPTION OF THE PREFERRED EMBODIMENTS

The present invention will now be described more fully with reference to the accompanying drawings, in which exemplary embodiments of the invention are shown. The invention may, however, be embodied in many different forms and should not be construed as being limited to the embodiments set forth therein; rather, these embodiments are provided so that this disclosure will be thorough and complete, and will fully convey the concept of the invention to those skilled in the art.

Figure 1:
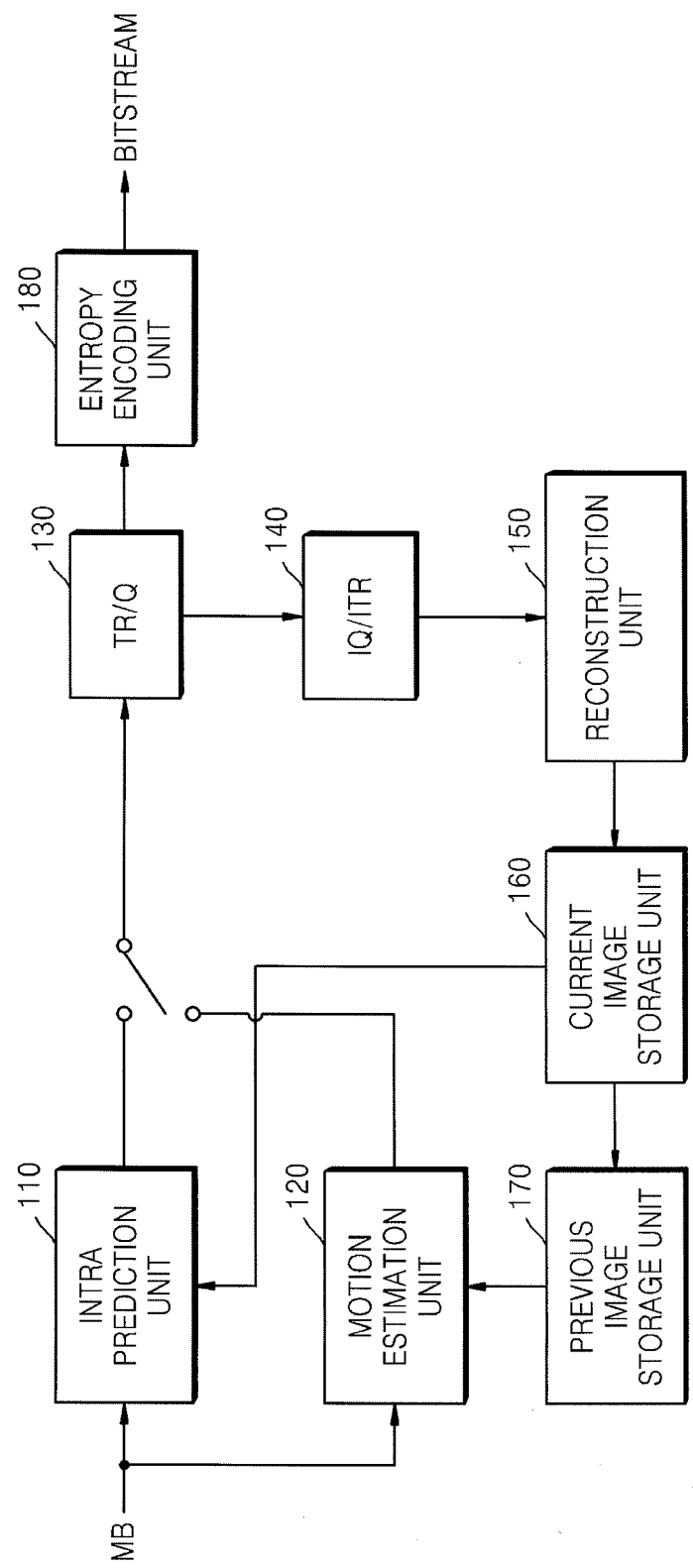
FIG. 1 is a schematic diagram of an image encoding apparatus according to an embodiment of the present invention.

FIG. 1 is a schematic diagram of an image encoding apparatus according to an embodiment of the present invention. The image encoding apparatus includes an intra prediction unit 110, a motion estimation unit 120, a transform/quantization (TR/Q) unit 130, an inverse quantization/inverse transform (IQ/ITR) unit 140, a reconstruction unit 150, a current image storage unit 160, a previous image storage unit 170, and an entropy encoding unit 180. The TR/Q unit 130 and the entropy encoding unit 180 form an encoder. A current image denotes a current frame, and a previous image denotes a previous frame.

Referring to FIG. 1, the intra prediction unit 110 performs intra prediction, that is, spatial prediction, on a current block, which is to be encoded, with reference to a restored current image stored in the current image storage unit 160 and outputs a first residual signal obtained as a result of intra prediction, together with information regarding a previous block referred to.

The motion estimation unit 120 performs inter prediction, that is, temporal prediction, on the current bock, which is to be encoded, in one of a plurality of block modes and with reference to one or more previous images stored in the previous image storage unit 170. Then, the motion estimation unit 120 outputs a second residual signal obtained as a result of inter prediction, together with information regarding a reference image, a block mode and a motion vector.

The TR/Q unit 130 receives the first residual signal or the second residual signal, whichever has a smaller value, and transforms and quantizes the current block to be encoded.

The IQ/ITR unit 140 inversely quantizes and inversely transforms the first or second residual signal transformed and quantized by the TR/Q unit 130.

The reconstruction unit 150 combines the first or second residual signal restored by the IQ/ITR unit 140 with restored previous blocks, reconstructs the current image, and stores the reconstructed current image in the current image storage unit 160.

The entropy encoding unit 180 performs entropy encoding on the first or second residual signal transformed and quantized by the TR/Q unit 130 and additional information provided together with the first or second residual signal and generates a bitstream.

In addition to the image encoding apparatus as the above, it is possible to implement various video codecs employing a motion prediction process, such as MPEG-1, 2, 4, H.264, VC-1 etc.

Figure 2A:
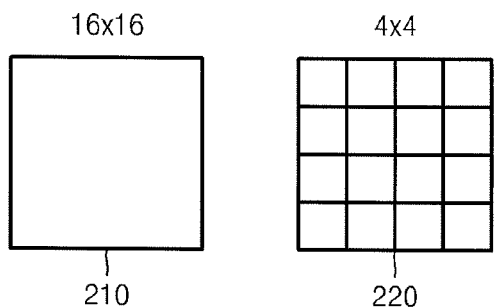
FIGS. 2A and 2B illustrate a plurality of block modes used for intra prediction and inter prediction during an image encoding process.
Figure 2B:
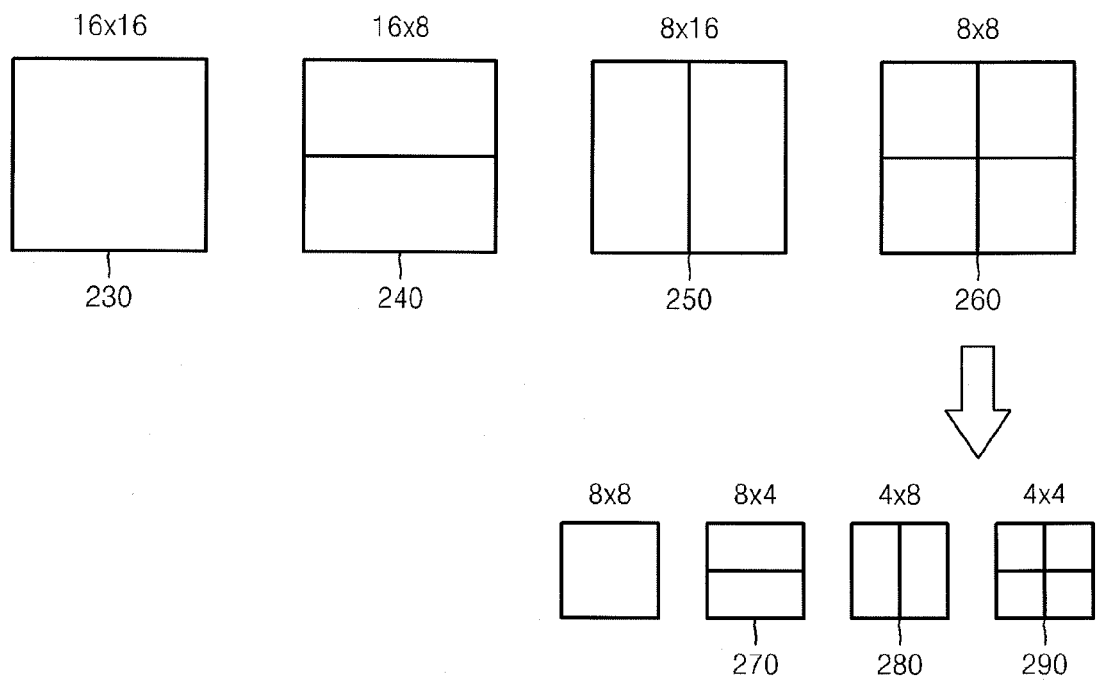

FIGS. 2A and 2B illustrate a plurality of block modes used for intra prediction and inter prediction during an image encoding process based on the assumption that an original image is encoded in units of 16×16 pixels. Specifically, FIG. 2A illustrates block modes used for intra prediction, that is, a 16×16 mode 210 and a 4×4 mode 220. FIG. 2B illustrates block modes used for inter prediction, that is, a 16×16 mode 230, a 16×8 mode 240, an 8×16 mode 250, an 8×8 mode 260, an 8×4 mode 270, a 4×8 mode 280, and a 4×4 mode 290. A plurality of reference images may be used for intra prediction and inter prediction. However, for ease of description, a reference image, that is, an immediately previous frame, will be used as an example.

FIG. 3 is a block diagram of a motion estimation apparatus according to an embodiment of the present invention. The motion estimation apparatus includes a motion estimation skip determination unit 310 and an optimal motion estimation unit 320. The optimal motion estimation unit 320 includes a first motion estimation unit 330 and a second motion estimation unit 350. The second motion estimation unit includes a candidate block mode determination unit 351, a block mode skip determination unit 353 and a motion vector determination unit 355. The above elements may be integrated into a processor (not shown) or implemented as a plurality of processors (not shown). The motion estimation skip determination unit 310 is optional.

Referring to FIG. 3, the motion estimation skip determination unit 310 performs preliminary motion estimation using an initial motion vector set for a current block that is to be encoded, compares a cost value obtained as a result of preliminary motion estimation to a first threshold value, and determines whether to skip motion estimation based on the comparison result. If the motion estimation skip determination unit 310 determines to skip motion estimation, it determines the initial motion vector as a real motion vector of the current block (①). If the motion estimation skip determination unit 310 determines not to skip motion estimation for the current block, it provides a first control signal, which indicates such determination, to the first motion estimation unit 330 of the optimal motion estimation unit 320.

If a condition set between a cost value obtained as a result of preliminary motion estimation or real motion estimation and a respective threshold value is satisfied, the optimal motion estimation unit 320 skips motion estimation in remaining block modes except for an initial block mode from a plurality of block modes, performs motion estimation on the current block in an initial block mode, and then determines a motion vector of the current block. If the condition set between the cost value obtained as a result of preliminary motion estimation or real motion estimation and the respective threshold value is not satisfied, the optimal motion estimation unit 320 performs motion estimation on the current block in candidate block modes among the block modes and then determines a motion vector of the current block.

Specifically, the first motion estimation unit 330 operates in response to the first control signal provided by the motion estimation skip determination unit 310. The first motion estimation unit 330 performs preliminary motion estimation in an initial block mode using the initial motion vector set for the current block and determines whether a block mode of the current block will be the initial block mode based on the result of comparison between a cost value obtained as a result of preliminary motion estimation and a second threshold value. Here, the initial block mode is determined by a size of the current block. That is, if the size of the current block is 16×16, the initial block mode is a 16×16 mode. If the first motion estimation unit 330 determines the block mode of the current block to be the initial block mode, it performs real motion estimation on the current block in the initial block mode and determines a motion vector obtained as a result of real motion estimation to be a real motion vector (②). If the first motion estimation unit 330 determines the block mode of the current block not to be the initial block mode, it provides a second control signal, which indicates such determination, to the second motion estimation unit 350.

The second motion estimation unit 350 operates in response to the second control signal provided by the first motion estimation unit 330. The second motion estimation unit 350 determines whether to skip residual block modes excluding the initial block mode from a plurality of candidate block modes determined for the current block. Then, the second motion estimation unit 350 performs motion estimation in the initial block mode or in all candidate block modes based on the determination result. If the second motion estimation unit 350 performs motion estimation only in the initial block mode, it determines a motion vector obtained as a result of motion estimation to be a motion vector of the current block. If the second motion estimation unit 350 performs motion estimation in all candidate block modes, it determines a motion vector having a smallest value among a plurality of motion vectors obtained as a result of motion estimation to be the motion vector of the current block. The second motion estimation unit 350 will now be described in more detail.

The candidate block mode determination unit 351 included in the second motion estimation unit 350 determines at least one candidate block mode among a plurality of block modes according to motion characteristics of pixels included in the current block. For example, the current block may be divided into a plurality of sub blocks, and preliminary motion estimation may be performed on each sub block. In this case, candidate block modes may be set variously according to the result of the preliminary motion estimation. That is, different candidate block modes are set when motion vectors of all sub blocks are identical, when respective motion vectors of upper and lower sub blocks are identical, and when respective motion vectors of right and left sub blocks are identical. When the size of the current block is 16×16, and when 16×16, 16×8, 8×16 and 8×8 block modes are used, the number of candidate block modes for motion estimation of the current block is determined to be one, two, or four.

The block mode skip determination unit 353 determines whether to skip the remaining block modes excluding the initial block mode from at least one candidate block modes which were determined for the current block.

If the block mode skip determination unit 353 determines to skip the remaining block modes excluding the initial prediction mode from the candidate block modes which were determined for the current block, the motion vector determination unit 355 performs real motion estimation on the current block in the initial block mode and determines the motion vector of the current block. If the block mode skip determination unit 353 determines not to skip the remaining block modes excluding the initial block mode from the candidate block modes which were determined for the current block, the motion vector determination unit 355 performs real motion estimation in all candidate block modes and determines the motion vector of the current block.

If only one candidate block mode exists, the operations of the block mode skip determination unit 353 and the motion vector determination unit 355 are modified.

Figure 4:
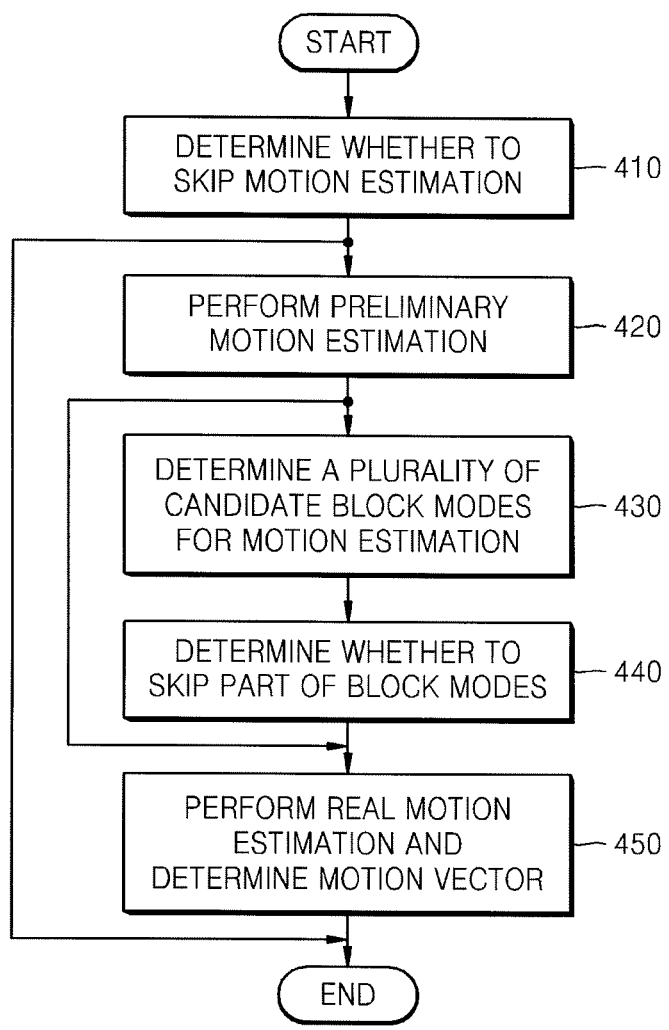
FIG. 4 is a flowchart illustrating a motion estimation method according to an embodiment of the present invention.

FIG. 4 is a flowchart illustrating a motion estimation method according to an embodiment of the present invention. Each operation included in the motion estimation method corresponds to the operation of each element illustrated in FIG. 3. In addition, each operation included in the motion estimation method may be programmed and implemented in a processor (not shown).

Referring to FIG. 4, in operation 410, it is determined whether to skip motion estimation of a current block to be encoded. If it is determined that the motion estimation of the current block is to be skipped, an initial motion vector is determined to a motion vector of the current block.

If it is determined that the motion estimation of the current block is not to be skipped, preliminary motion estimation is performed in an initial block mode in operation 420. Based on the result of the preliminary motion estimation, it is determined whether the initial block mode is to be a block mode of the current block. If the initial block mode is determined to be the block mode of the current block, a motion vector, which is obtained as a result of motion estimation performed in the initial block mode, is determined to be the motion vector of the current block.

If the initial block mode is not determined to be the block mode of the current block, at least one candidate block mode including the initial block mode is determined for motion estimation of the current block in operation 430, In operation 440, it is determined whether to skip remaining block modes excluding the initial block mode from the candidate block modes which were determined for the current block.

If it is determined in operation 440 that the remaining block modes excluding the initial block mode are to be skipped, motion estimation is performed on the current block in the initial block mode, and a motion vector obtained as a result of motion estimation is determined to be the motion vector of the current block in operation 450. If it is determined in operation 440 that the remaining block modes excluding the initial block mode are not to be skipped, motion estimation is performed on the current block in the candidate block modes, and a motion vector having a smallest value among a plurality of motion vectors obtained as a result of motion estimation is determined to be the motion vector of the current block. In addition, if the initial block mode is determined to be the block mode of the current block in operation 420, motion estimation is performed on the current block in the initial block mode, and a motion vector obtained as a result of motion estimation is determined to be the motion vector of the current block.

Specific embodiments of operations 410 through 450 will hereinafter be described with reference to FIGS. 5 through 9 using a case where an original image is encoded in units of 16×16 pixels and where four block modes, that is, the 16×16, 16×8, 8×16 and 8×8 modes 230 through 260, are set for inter prediction. When necessary, the 8×4 mode 270, the 4×8 mode 280 and the 4×4 mode 290 can be added to the above block modes. In addition, when the original image is encoded in units of 8×8 pixels, four block modes used for inter prediction, that is, the 8×8, 8×4, 4×8 and 4×4 modes 260 through 290, may set. Ultimately, the composition of block modes can vary according to an encoding unit of the original image, desired restored image quality, and encoding speed.

Figure 5:
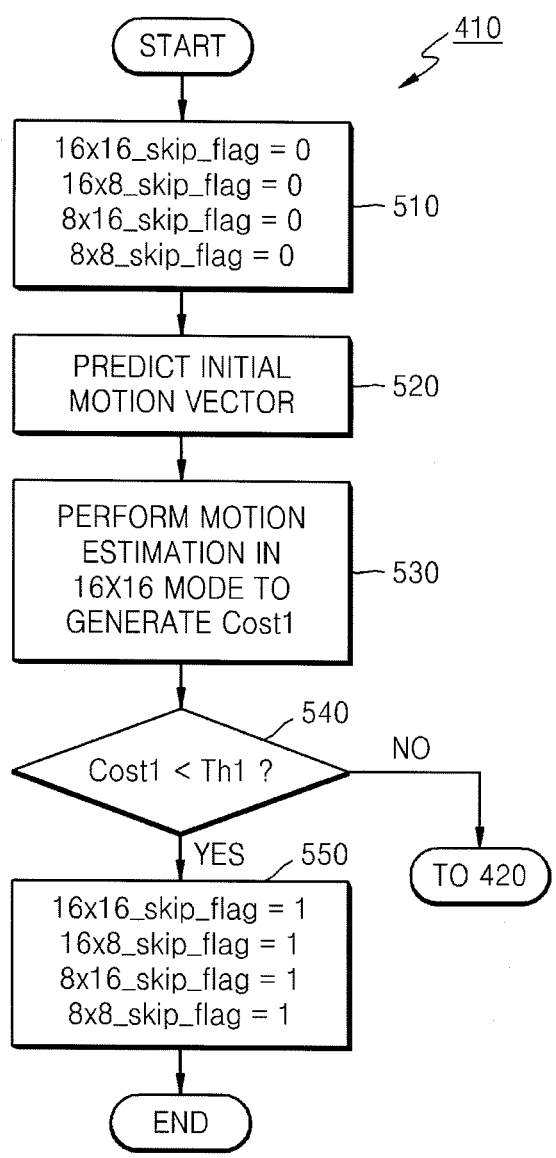
FIG. 5 is a flowchart illustrating a specific embodiment of operation 410 of FIG. 4.

FIG. 5 is a flowchart illustrating a specific embodiment of operation 410 of FIG. 4 in which it is determined whether to skip motion estimation.

Referring to FIG. 5, operation 510 is an initialisation operation. Respective skip flags (16×16_skip_flag, 16×8_skip_flag, 8×16_skip_flag, and 8×8_skip_flag) of four block modes are all set to zero.

In operation 520, an initial motion vector of a current block to be encoded, i.e., a 16×16 main block, is predicted. That is, the initial motion vector of the current block, which is to be encoded, is predicted using motion vectors of previous blocks, which have already been encoded before the current block, that is, motion vectors of upper, diagonal, and left blocks. Here, the initial motion vector of the current block may be predicted using a median prediction technique which is used in H. 264, but is not limited thereto.

In operation 530, preliminary motion estimation is performed on the current block in the 16×16 mode using the initial motion vector, and a first cost value Cost1 is generated as a result of preliminary motion estimation. The first cost value Cost1 may be calculated using the differences between respective values of pixels included in the current block and those of corresponding pixels included in a previous block which is designated by the initial motion vector. Here, the first cost value Cost1 can be calculated using a sum of absolute differences (SAD) method, a sum of squared differences (SSD) method, or a sum of absolute transformed differences (SATD) method, but is not limited thereto.

In operation 540, the first cost value Cost1 is compared to a first threshold value TH1. The first threshold value TH1 may be a constant value experimentally pre-calculated in consideration of restored image quality and the time required for motion estimation according to a motion estimation skip rate for an image sequence. For example, according to if the time required for motion estimation is a more important factor than the restored image quality or not, the first threshold value TH1 is set to a different value. The first threshold value TH1 may also be set to a variable value. In this case, a variable value may be set for each frame or each block that is to be encoded. When a variable value is set for each frame, an initial quantization value Qp of a current frame, which is determined according to a result of encoding an immediately previous frame is used. On the other hand, when a variable value is set for each block that is to be encoded, an initial quantization value Qp of a current block, which is determined according to a result of encoding an immediately previous block, is used.

If the result of comparison in operation 540 indicates that the first cost value Cost1 is less than the first threshold value TH1, it is determined to skip motion estimation of the current block. Consequently, the initial motion vector predicted in operation 520 becomes a real motion vector of the current block. Meanwhile, information indicating that motion estimation of the current block is to be skipped may be represented by setting all of the skip flags (16×16_skip_flag, 16×8_skip_flag, 8×16_skip_flag, and 8×8_skip_flag) of the four block modes to one. If the result of comparison in operation 540 indicates that the first cost value Cost1 is greater than the first threshold value TH1, operation 420 is performed.

Figure 6:
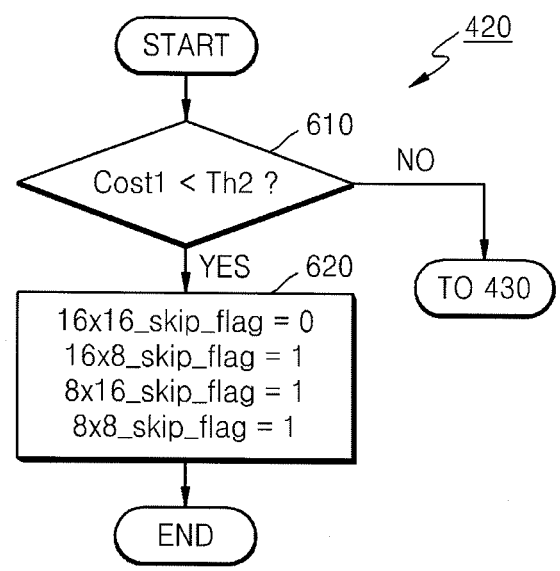
FIG. 6 is a flowchart illustrating a specific embodiment of operation 420 of FIG. 4.

FIG. 6 is a flowchart illustrating a specific embodiment of operation 420 of FIG. 4 in which the initial block mode, that is, the 16×16 mode, is determined to be the block mode of the current block.

Referring to FIG. 6, if the result of comparison in operation 540 of FIG. 5 indicates that the first cost value Cost1 is greater than the first threshold value TH1, in operation 610, the first cost value Cost1 is compared to a second threshold value TH2. The second threshold value TH2 may be a constant value experimentally pre-calculated in consideration of restored image quality and the time required for motion estimation according to a rate at which the initial block mode, that is, the 16.times.16 mode, is used as a block mode of an image sequence. The second threshold value TH2 may be calculated as a constant value or a variable value using the method used for the first threshold value TH1. Generally, the second threshold value TH2 is set to be greater than the first threshold value TH1.

In operation 620, if the result of comparison in operation 610 indicates that the first cost value Cost1 is less than the second threshold value TH2, the initial block mode, that is, the 16.times.16 mode, is determined to be the block mode of the current block. Meanwhile, information indicating that the initial block mode, that is, the 16.times.16 mode, has been determined to be the block mode of the current block may be represented by setting 16.times.16_skip_flag in the skip flags of the four block modes to zero. If the result of comparison in operation 610 indicates that the first cost value Cost1 is greater than the second threshold value TH2, operation 430 of FIG. 5 is performed.

Figure 7:
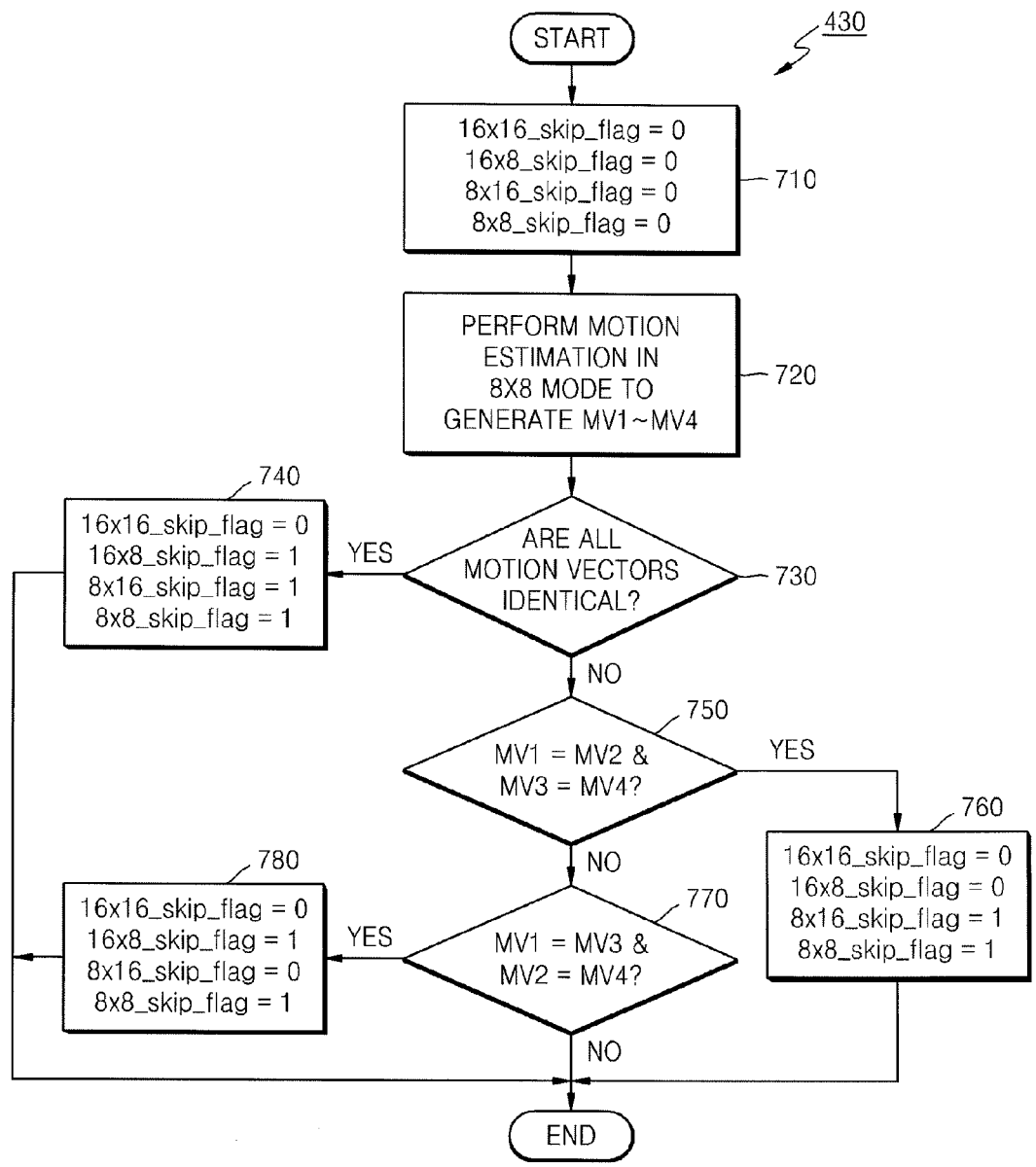
FIG. 7 is a flowchart illustrating a specific embodiment of operation 430 of FIG. 4.

FIG. 7 is a flowchart illustrating a specific embodiment of operation 430 of FIG. 4 in which candidate block modes of a current block are determined among a plurality of block modes.

Referring to FIG. 7, operation 710 is an initialisation operation. Respective skip flags (16×16_skip_flag, 16×8_skip_flag, 8×16_skip_flag, and 8×8_skip_flag) of four block modes are all set to zero.

In operation 720, a current block to be encoded, that is, a 16×16 main block, is divided into first through fourth sub blocks, each having 8×8 pixels. Motion estimation is performed on the first through fourth sub blocks in an 8×8 prediction mode to generate first through fourth motion vectors MV1 through MV4. Here, full-pel motion estimation or half-pel motion estimation is performed in consideration of the time required for motion estimation, but is not limited thereto. Of the first through fourth sub blocks, the first and second sub blocks are set as upper sub blocks, and the third and fourth sub blocks are set as lower sub blocks.

In operation 730, it is determined whether the first through fourth motion vectors MV1 through MV4 generated in operation 720 have the same value.

If the result of determination in operation 730 indicates that the first through fourth motion vectors MV1 through MV4 have the same value, the initial block mode, that is, the 16×16 mode, is determined to be a block mode of the current block in operation 740. Information indicating that the initial block mode, that is, the 16×16 mode, has been determined to be the block mode of the current block may be represented by setting 16×16_skip_flag in the skip flags of the four block modes to zero.

If the result of determination in operation 730 indicates that the first through fourth motion vectors MV1 through MV4 do not have the same value, it is determined in operation 750 whether motion vectors of the upper sub blocks, that is, the first and second motion vectors MV1 and MV2, have the same value and, at the same time, whether motion vectors of the lower sub blocks, that is, the third and fourth motion vectors MV3 and MV4, have the same value.

If the result of determination in operation 750 indicates that the first and second motion vectors MV1 and MV2 have the same value and, at the same time, the third and fourth motion vectors MV3 and MV4 have the same value, the initial block mode, i.e., the 16×16 mode, and the 16×8 mode, are determined to be candidate block modes of the current block in operation 760. Information indicating that the 16×16 mode and the 16×8 mode have been determined to be the candidate block modes of the current block may be represented by setting 16×16_skip_flag and 16×8_skip_flag in the skip flags of the four block modes to zero.

If the result of determination in operation 750 indicates that the first and second motion vectors MV1 and MV2 of the upper sub blocks have different values or that the third and fourth motion vectors MV3 and MV4 of the lower sub blocks have different values, it is determined in operation 770 whether motion vectors of left sub blocks, that is, the first and third motion vectors MV1 and MV3, have the same value and, at the same time, whether motion vectors of right sub blocks, that is, the second and fourth motion vectors MV2 and MV4, have the same value.

If the result of determination in operation 770 indicates that the first and third motion vectors MV1 and MV3 have the same value and, at the same time, the second and fourth motion vectors MV2 and MV4 have the same value, the initial block mode, i.e., the 16×16 mode, and the 8×16 mode, are determined to be candidate block modes of the current block in operation 780. Information indicating that the 16×16 mode and the 8×16 mode have been determined to be the candidate block modes of the current block may be represented by setting 16×16_skip_flag and 8×16_skip_flag in the skip flags of the four block modes to zero.

If the result of determination in operation 780 indicates that the first and third motion vectors MV1 and MV3 of the left sub blocks have different values or that the second and fourth motion vectors MV2 and MV4 of the right sub blocks have different values, the four block modes are determined for the current block, and this information may be represented by the skip flag of each block mode which was set to zero in the initialisation operation, that is, operation 710.

Figure 8:
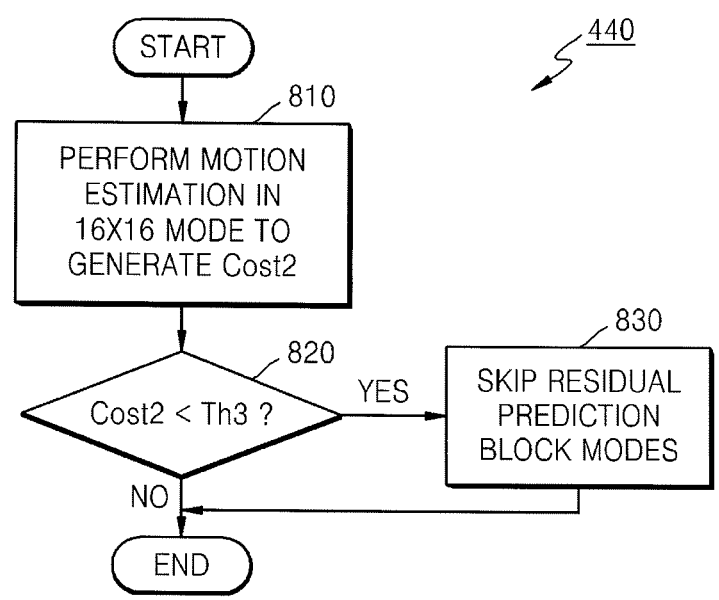
FIG. 8 is a flowchart illustrating a specific embodiment of operation 440 of FIG. 4.

FIG. 8 is a flowchart illustrating a specific embodiment of operation 440 of FIG. 4 in which it is determined whether to skip remaining block modes excluding the initial block mode from a plurality of candidate block modes.

Referring to FIG. 8, in operation 810, motion estimation is performed on a current block, which is to be encoded, in the 16.times.16 mode. As a result, a first sub motion vector is obtained. In addition, a second cost value Cost2 is generated from the first sub motion vector. The second cost value Cost2 may be calculated using the differences between respective values of pixels included in the current block and those of corresponding pixels included in a previous block which is designated by the first sub motion vector. Like the first cost value Cost1, the second cost value Cost2 can be calculated using the SAD method, the SSD method, or the SATD method, but is not limited thereto.

In operation 820, the second cost value Cost2 is compared to a third threshold value TH3. The third threshold value TH3 may be a constant value experimentally pre-calculated in consideration of restored image quality and the time required for motion estimation according to a rate at which the initial block mode, that is, the 16.times.16 mode, is used as a block mode of an image sequence. The third threshold value TH3 may be calculated as a constant value or a variable value using the method used for the first and second threshold values TH1 and TH2. Generally, the third threshold value TH3 is set to be equal to or greater than the second threshold value TH2, but is not limited thereto. Compared to the second threshold value TH2, the third threshold value TH3 can take into consideration a cost value, which is obtained after motion estimation is performed on a previous block in the 16.times.16 mode, in addition to an initial quantization value Qp of the current block. In operation 830, if the result of comparison in operation 820 indicates that the second cost value Cost2 is less than the third threshold value TH3, remaining block modes excluding the initial block mode are determined to be skipped, and the initial block mode is determined to be a block mode of the current block.

Figure 9:
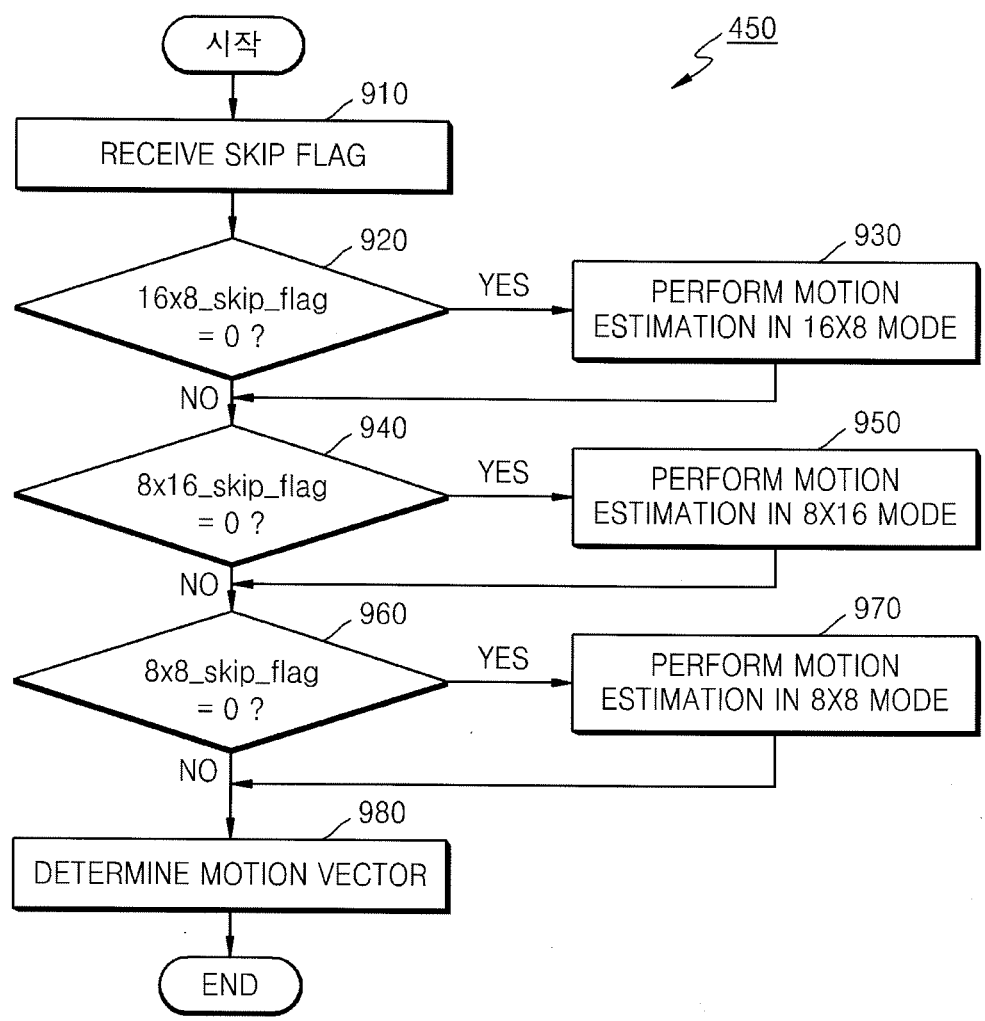
FIG. 9 is a flowchart illustrating a specific embodiment of operation 450 of FIG. 4.

FIG. 9 is a flowchart illustrating a specific embodiment of operation 450 of FIG. 4 in which a final motion vector of the current block is obtained.

Referring to FIG. 9, in operation 910, the skip flag of each block mode set in operations 410 through 440 is received together with the first sub motion vector obtained by performing motion estimation in the 16×16 mode.

If the result of comparison in operation 820 indicates that the second cost value Cost2 is greater than the third threshold value TH3, it is determined in operation 920 whether the skip flag (16×8_skip_flag) of the 16×8 mode, has been set to zero. If the skip flag (16×8_skip_flag) has been set to zero, motion estimation is performed in the 16×8 mode to obtain a second sub motion vector in operation 930.

If the result of comparison in operation 920 indicates that the skip flag (16×8_skip_flag) of the second block mode has not been set to zero or if operation 930 has been performed, it is determined in operation 940 whether the skip flag (8×16_skip_flag) of the 8×16 mode, has been set to zero. If the skip flag (8×16_skip_flag) has been set to zero, motion estimation is performed in the 8×16 mode to obtain a third sub motion vector in operation 950.

If the result of comparison in operation 940 indicates that the skip flag (8×16_skip_flag) of the third block mode has not been set to zero or if operation 950 has been performed, it is determined in operation 960 whether the skip flag (8×8_skip_flag) of the 8×8 mode, has been set to zero. If the skip flag (8×8_skip_flag) has been set to zero, motion estimation is performed in the 8×8 mode to obtain a fourth sub motion vector in operation 970.

In operation 980, a motion vector having a smallest value among the first through fourth sub motion vectors, which have been obtained using the candidate block modes of the current block, is determined to be a real motion vector of the current block that is to be encoded Table 1 below is used to evaluate performance of the motion estimation method according to the present invention. Table 1 compares four image sequences in each operation of the motion estimation method according to the present invention in terms of average quality of a restored image (PSNR) and encoding speed.

TABLE 1

|  | Mobile | Foreman | Stefan | Coastguard | Average |
| --- | --- | --- | --- | --- | --- |
| Original | 25.94 (4761) | 34.36 (4767) | 27.85 (4656) | 30.12 (4698) | 29.57 (4720) |
| Skipping Motion estimation | 25.96 (4585) | 34.38 (4240) | 27.82 (3987) | 30.12 (4568) | 29.57 (4345) |
| Performing preliminary motion estimation in 16 × 16 mode | 25.95 (3301) | 34.28 (2680) | 27.75 (2953) | 30.09 (2476) | 29.52 (2852) |

TABLE 1-continued

|  | Mobile | Foreman | Stefan | Coastguard | Average |
|---|---|---|---|---|---|
| Determining a plurality of candidate block modes | 25.92 (2615) | 34.21 (2074) | 27.67 (2206) | 30.06 (2163) | 29.47 (2265) |
| Terminating motion estimation in 16 × 16 mode among candidate block modes | 25.93 (2086) | 34.19 (1911) | 27.57 (1960) | 30.04 (1855) | 29.43 (1953) |

Referring to Table 1, while PSNR did not significantly improve after the operations included in the motion estimation method according to the present invention were sequentially performed, encoding speed dramatically increased as compared to when a conventional motion estimation method was used. That is, in the final operation of the motion estimation method according to the present invention, while the PSNR for four image sequences was reduced by 0.14 dB, encoding speed increased by 2.4 times.

The present invention can also be implemented as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet).

The computer-readable recording medium can also be distributed over network-coupled computer systems so that the computer-readable code is stored and executed in a distributed fashion. Also, functional programs, code, and code segments for accomplishing the present invention can be easily construed by programmers skilled in the art to which the present invention pertains.

As described above, an image encoding apparatus according to the present invention performs motion estimation using a plurality of block modes including an initial block mode. The image encoding apparatus skips motion estimation when a predetermined condition is satisfied or skips block modes excluding the initial prediction block. Therefore, the image encoding apparatus can significantly increase the overall encoding speed since it can dramatically reduce the time required for motion estimation while hardly affecting subjective restored image quality. In particular, considering a trade-off between restored image quality and encoding speed, the encoding speed can be increased if the restored image quality is reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A motion estimation apparatus comprising:
a first motion estimation unit, implemented by at least one processing device, to perform a first motion estimation on a current block using an initial motion vector in an initial block mode and to determine a block mode of the current block based on a result of the first motion estimation; and
a second motion estimation unit to determine at least one candidate block mode including the initial block mode among a plurality of block modes according to motion characteristics of pixels included in the current block and to perform a second motion estimation on the current block in either the initial block mode or the at least one candidate block mode so as to determine a motion vector of the current block,
wherein the second motion estimation unit comprises:
a candidate block mode determination unit to determine the at least one candidate block mode of the current block according to a result of comparing a respective plurality of motion vectors of a plurality of sub-blocks forming the current block with each other; and
a block mode skip determination unit to determine whether to skip remaining block modes excluding the initial block mode from the at least one candidate block mode of the current block after determining the at least one candidate block mode of the current block.

2. The apparatus of claim 1 further comprising:
a motion estimation skip determination unit to perform the first motion estimation on the current block using the initial motion vector in the initial block mode and to determine whether to skip motion estimation of the current block according to a result of the first motion estimation.

3. The apparatus of claim 1, wherein the second motion estimation unit further comprises:
a motion vector determination unit to determine a motion vector of the current block using either the initial block mode or the at least one candidate block mode.

4. The apparatus of claim 1, wherein the at least one candidate block mode is determined differently according to a distribution of sub-blocks that have identical motion vector over the plurality of sub-blocks forming the current block.

5. A motion estimation apparatus comprising:
a first motion estimation unit, implemented by at least one processing device, to perform a first motion estimation on a current block using an initial motion vector in an initial block mode and to determine the initial block mode to be a block mode of the current block according to a result of the first motion estimation;
a candidate block mode determination unit to determine at least one candidate block mode, including the initial block mode among a plurality of block modes, of the current block according to motion characteristics of pixels included in the current block by comparing a respective plurality of motion vectors of a plurality of sub-blocks forming the current block with each other;
a block mode skip determination unit to determine whether to skip remaining block modes excluding the initial block mode from the at least one candidate block mode of the current block after determining the at least one candidate block mode of the current block; and
a motion vector determination unit to determine a motion vector of the current block using either the initial block mode or the at least one candidate block mode based on a result of determination in the block mode skip determination unit.

6. A motion estimation method comprising:
performing, by using at least one processing device, a first motion estimation on a current block using an initial motion vector in an initial block mode to determine a block mode of the current block based on a result of the first motion estimation; and
performing a second motion estimation on the current block in either the initial block mode or at least one candidate block mode including the initial block mode among a plurality of block modes by determining the at least one candidate block mode according to motion characteristics of pixels included in the current block,
wherein the performing of the second motion estimation comprises:
determining the at least one candidate block mode of the current block according to a result of comparing a respective plurality of motion vectors of a plurality of sub-blocks forming the current block with each other; and
determining whether to skip remaining block modes excluding the initial block mode from the at least one candidate block mode of the current block after determining the at least one candidate block mode of the current block.

7. The method of claim 6 further comprising:
performing the first motion estimation on the current block using the initial motion vector in the initial block mode and determining whether to skip motion estimation of the current block according to a result of the first motion estimation.

8. The method of claim 7, wherein, when a size of the current block is 16×16 pixels, when the initial block mode comprises a 16×16 mode, and when block modes comprise a 16×8 mode, an 8×16 mode and an 8×8 mode, the skipping of motion estimation comprises:
performing the first motion estimation on the current block using the initial motion vector in the 16+16 mode; and
determining whether to skip motion estimation of the current block according to a result of comparing a first cost value, which is obtained as a result of the first motion estimation, to a first threshold value.

9. The method of claim 7, wherein, when the size of the current block is 16×16 pixels, when the initial block mode comprises a 16×16 mode, and when remaining block modes comprise a 16×8 mode, an 8×16 mode and an 8×8 mode, the performing of the first motion estimation comprises:
performing the first motion estimation on the current block using the initial motion vector in the 16×16 mode;
deciding whether to determine the 16×16 mode to be a block mode of the current block according to a result of comparing a first cost value, which is obtained as a result of the first motion estimation, to a second threshold value; and
performing motion estimation on the current block in the 16×16 mode when the 16×16 mode is determined to the block mode of the current block and generating a motion vector.

10. The method of claim 6, wherein the performing of the second motion estimation further comprises:
determining a motion vector of the current block using either the initial block mode or the at least one candidate block mode.

11. The method of claim 10, wherein, when the size of the current block is 16×16 pixels, when the initial block mode comprises a 16×16 mode, and when remaining block modes comprise a 16×8 mode, an 8×16 mode and an 8×8 mode, the determining of the at least one candidate block mode comprises dividing the current block into first through fourth sub-blocks and determining the at least one candidate block mode of the current block according to the result of comparing first through fourth sub-motion vectors of the first through fourth sub-blocks with each other.

12. The method of claim 11, wherein the at least one candidate block mode of the current block are different when the first through fourth sub- motion vectors are all identical, when sub-motion vectors of upper sub blocks among the first through fourth sub-blocks are identical while sub-motion vectors of lower sub blocks among the first through fourth sub-blocks are identical, and when sub-motion vectors of left sub-blocks among the first through fourth sub- are identical while sub- motion vectors of right sub-blocks among the first through fourth sub-blocks are identical.

13. The method of claim 10, wherein, when the size of the current block is 16×16 pixels, when the initial block mode comprises a 16×16 mode, and when remaining block modes comprise a 16×8 mode, an 8×16 mode and an 8×8 mode, the skipping of the block modes comprises:
performing motion estimation on the current block in the 16×16 mode; and
skipping the remaining block modes excluding the 16×16 mode from the at least one candidate block mode of the current block according to a result of comparing a second cost value, which is obtained as a result of motion estimation on the current block in the 16×16 mode, to a third threshold value.

14. A non-transitory computer-readable recording medium on which a program for executing the motion estimation method of claim 6 is recorded.

15. The method of claim 6, wherein the at least one candidate block mode is determined differently according to a distribution of sub-blocks that have identical motion vector over the plurality of sub-blocks forming the current block.

16. A motion estimation method comprising:
performing, by using at least one processing device, a first motion estimation on a current block using an initial motion vector in an initial block mode and determining the initial block mode to be a block mode of the current block according to a result of the first motion estimation;
determining at least one candidate block mode, including the initial block mode among a plurality of block modes, of the current block according to motion characteristics of pixels included in the current block by comparing a respective plurality of motion vectors of a plurality of sub-blocks forming the current block with each other;
determining whether to skip remaining block modes excluding the initial block mode from the at least one candidate block mode of the current block after determining the at least one candidate block mode of the current block; and
determining a motion vector of the current block using either the initial block mode or the at least one candidate block mode, based on a result of determining whether to skip remaining block modes.

17. An image encoding apparatus comprising:
a motion estimation unit, implemented by at least one processing device, to perform a first motion estimation on a current block using an initial motion vector in an initial block mode, to determine a block mode of the current block based on a result of the first motion estimation, to determine at least one candidate block mode including the initial block mode among a plurality of block modes according to motion characteristics of pixels included in the current block by comparing a respective plurality of motion vectors of a plurality of sub-blocks forming the current block with each other, to determine whether to skip remaining block modes excluding the initial block mode from the at least one candidate block mode of the current block after determining the at least one candidate block mode of the current block and to perform a second motion estimation on the current block in either the initial block mode or the at least one candidate block mode; and an encoding unit to encode a residual signal generated by using an output of the motion estimation unit.

18. The apparatus of claim 17, wherein the motion estimation unit comprises:

a first motion estimation unit to perform a first motion estimation on a current block using an initial motion vector in an initial block mode and to determine the initial block mode to be a block mode of the current block according to a result of the first motion estimation;

a candidate block mode determination unit to determine the at least one candidate block mode of the current block according to a result of comparing a respective plurality of motion vectors of a plurality of sub-blocks forming the current block with each other;

a block mode skip determination unit to determine whether to skip remaining block modes excluding the initial block mode from the at least one candidate block mode of the current block; and a motion vector determination unit to determine a motion vector of the current block using either the initial block mode or the at least one candidate block mode based on a result of determination in the block mode skip determination unit.

19. The apparatus of claim 18, wherein the motion estimation unit further comprises:

a motion estimation skip determination unit to perform the first motion estimation on the current block using the initial motion vector in the initial block mode and to determine whether to skip motion estimation of the current block according to a result of the first motion estimation.

20. An image encoding method comprising:

performing, by using at least one processing device, a first motion estimation on a current block using an initial motion vector in an initial block mode, determining a block mode of the current block based on a result of the first motion estimation, determining at least one candidate block mode including the initial block mode among a plurality of block modes according to motion characteristics of pixels included in the current block by comparing a respective plurality of motion vectors of a plurality of sub-blocks forming the current block with each other, determining whether to skip remaining block modes excluding the initial block mode from the at least one candidate block mode of the current block after determining the at least one candidate block mode of the current block and performing a second motion estimation on the current block in either the initial block mode or the at least one candidate block mode; and encoding a residual signal provided by the performing of the motion estimation.

21. The method of claim 20, wherein the performing of the motion estimation comprises:

performing the first motion estimation on the current block using the initial motion vector in the initial block mode and determining the initial block mode to be a block mode of the current block according to a result of the first motion estimation;

determining the at least one candidate block mode of the current block according to a result of comparing a respective plurality of motion vectors of a plurality of sub-blocks forming the current block with each other;

determining whether to skip remaining block modes excluding the initial block mode from the at least one candidate block mode of the current block; and determining a motion vector of the current block using either the initial block mode or the at least one candidate block mode based on a result of determining whether to skip remaining block modes.

22. The method of claim 21, wherein the performing of the motion estimation further comprises:

performing the first motion estimation on the current block using the initial motion vector in the initial block mode and determining whether to skip motion estimation of the current block according to a result of the first motion estimation.

23. A non-transitory computer-readable recording medium on which a program for executing the image encoding method of claim 20 is recorded.

* * * * *